Figure 1:
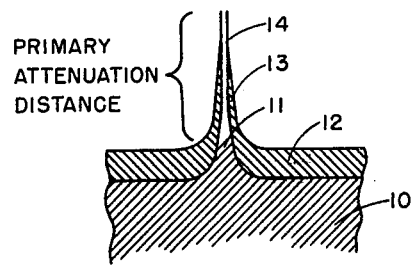

Nov. 3, 1964  L. E. ASHMAN  3,155,475
PROCESS FOR DRAWING FIBER THROUGH A SUPERNATANT LIQUID
Filed Aug. 1, 1960

Leland E. Ashman
*INVENTOR.*

BY
Attorney 3,155,475
PROCESS FOR DRAWING FIBER THROUGH A
SUPERNATANT LIQUID
Leland E. Ashman, Belmont, Mass., assignor to Arthur D.
Little, Inc., Cambridge, Mass., a corporation of
Massachusetts
Filed Aug. 1, 1960, Ser. No. 46,456
12 Claims. (Cl. 65—2)

This invention relates to the processing of normally solid materials which are viscous during melting. More particularly this invention relates to a novel method for forming long or continuous fibers from these materials.

Fibers other than those formed of naturally occurring materials (e.g., cotton, silk and the like) are desirable for many applications. For example, glass in the form of very thin fibers, and more particularly in the form of long, continuous fibers, has found widespread acceptance in many uses, among which may be listed woven materials and reinforcing for plastics and synthetic resins.

A number of ways for making fibers from melts of materials of the character described have been proposed and some are currently in use in commercial processes. The present invention is specifically concerned with a process in which a stream of the molten material is attenuated into a fine solid fiber, the attenuation being an intrinsic part of the fiber formation.

The processes of the prior art may be illustrated with reference to those devised for the manufacture of vitreous fibers such as the well-known glass fibers. Such processes, which have the attenuation of a molten material in common, are applicable to making continuous glass filaments as well as short length fibers if desired. A typical process comprises the steps of downwardly drawing filaments from molten glass through platinum bushings having a large number of orifices, from each of which a fiber is drawn to form a single continuous strand. The required attenuation of the liquid stream flowing from the bushings must of course be attained before final solidification sets in. This widely used process has, however, several inherent drawbacks.

First, the bushings used are made of platinum or platinum alloys and are in the form of plates or troughs containing a large number of these orifices. The bushings are heated to the desired temperature by passing electric current through the platinum and thus the type of glass which may be converted into fiber is limited to glass compositions having melting points below the temperature which the platinum bushings can tolerate. Thus at present many possible glass compositions cannot be used to form glass fibers because their working temperatures are so high that the platinum bushings are unable to support the melt without sagging.

Second, other glass (i.e., inorganic vitreous) compositions from which it would be desirable to form fibers have such a limited working range that they cannot be formed by the bushing method since this requires a definite amount of time to attain the proper attenuation of the fibers in their formation.

As a third drawback may be cited the fact that the present method of making glass fibers is essentially limited to compositions having certain viscosity-temperature characteristics which allow attenuation only of a relatively viscous material through a fairly slow viscosity change with temperature before solidification sets in.

Thus the prior art processes, in addition to requiring expensive equipment, place restrictions on the type of glass that can be formed into continuous fibers. There are, of course, other lower cost methods of making fibers, such as directing a stream of molten material onto a spinning disk, or steam or air blowing the molten material, but these processes are applicable only to the manufacture of short-length fibers and are not capable of producing long or continuous fibers.

Attempts to pull fibers from a molten mass of glass, for example, have been made, but this technique is applicable only to the formation of rods or to relatively thick fibers having diameters of one mm. or larger. This means that the only practical way up to the present of forming thin glass fibers in continuous form has been the use of the above-described relatively expensive platinum bushing method which upon some occasions has proved to possess some inherent difficulties.

It would therefore be desirable to be able to form fibers by a simple process which does not require use of the expensive and often difficult to operate noble metal bushings. It would also be desirable to be able to form essentially continuous fibers by an attenuation process from a greater number of materials than is now possible with the processes being used.

For convenience of description of this invention, the materials which may be used to continuously form fibers in accordance with this invention may be referred to as "fiber-forming" materials, and they may generally be defined as those which when melted have a viscosity of not less than 5 poises and preferably not less than about 100 poises. In the molten state the fiber-forming material should not have a viscosity of greater than about 3000 poises for beyond this the drawing of fibers therefrom will become undesirably slow from an economical point of view. It is, moreover, preferable that the fiber-forming liquid pool have a viscosity falling within the range of between about 500 and 2000 poises. The fiber-forming materials of this invention may be further characterized as those which solidify in the form of thin fibers (e.g., about one millimeter or less) and permanently retain this fiber structure.

It is therefore a primary object of this invention to provide a process which makes possible the drawing of thin and preferably continuous fibers from a molten pool of a fiber-forming material. Another object is to provide a method of making glass fibers in a long or essentially continuous form which eliminates the use of platinum bushings. It is yet another object of this invention to provide fibers in the manner described from compositions, and particularly from glass, or inorganic vitreous compositions, which have heretofore been considered unsuitable for fiber manufacture either because of their high melting range or because of their limited working temperature range. It is another object of this invention to provide a way of protecting a pool of a molten fiber-forming material so that it may be used to pull fibers therefrom, fibers which may be as thin as one to two microns. It is still another object to provide a process of the character described which permits the control of fiber forming temperature and which results in the formation of fibers having improved uniformity. These and other objects will become apparent in the following description of this invention.

The process of this invention for making thin, continuous fibers may be characterized by the step of pulling fibers from a molten pool of a fiber-forming material covered with a supernatant liquid at a temperature which, at the interface with the molten fiber-forming material, approximates the temperature of the molten pool. The thickness of the supernatant liquid should be sufficient to insulate the surface of the molten pool thereby to prevent any appreciable viscosity gradient normal to the surface of the pool, thereby to permit pulling thin, continuous fibers therefrom.

Figure 2:
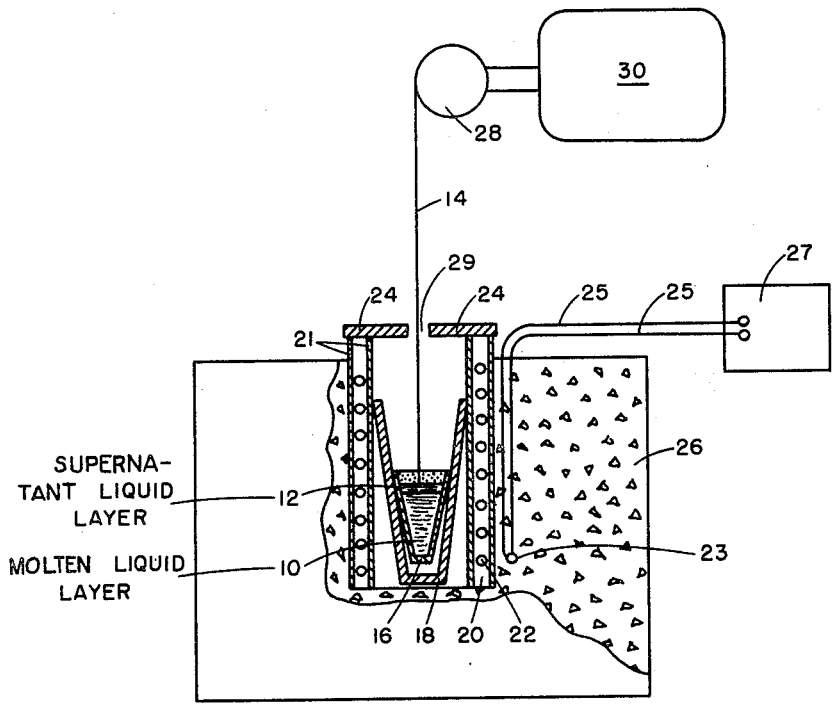

This invention may be otherwise described with reference to the following drawings in which:

FIG. 1 is a diagrammatic sketch of a fiber being pulled in accordance with this invention; and FIG. 2 is a diagrammatic representation of one form of apparatus suitable for the practice of the process of this invention.

As pointed out above, pulling fibers or rods less than one mm. in diameter from a molten pool of a material meeting the requirements for a fiber-forming material as defined is difficult, and pulling fibers of a textile quality (about twenty microns or less) is virtually impossible. This is particularly true in the formation of very thin glass fibers. In the following description of this invention the formation of glass fibers will be used to describe the process for the sake of convenience in presentation. However, as shown in the examples, the process is equally well adaptable to any material which in the molten state has a viscosity greater than 5, and preferably greater than 100 poisess.

It is believed that the existence of instabilities which prevent the formation of very fine fibers, in a system from which it is sought to pull thin fibers from a molten pool, results from a sharp temperature gradient normal to the surface of the pool brought about by ambient temperature conditions existing above the pool. This temperature gradient forms what is hereinafter referred to as "skin" on the molten pool's surface. The flow of fiber-forming material from the pool into a fiber which is being pulled from the pool is predominantly from this skin and it is believed to create unstable flow patterns in the molten material directly below the skin, and these flow patterns appear in turn to be reflected in the instabilities in fiber formation. It seems reasonable then to postulate that slight thermal or compositional variations on the surface of the pool can be immediately reflected in instabilities in fiber formation.

By the process of this invention this surface skin is completely or substantially avoided by covering the molten pool of fiber-forming material with a supernatant liquid which affords an insulating barrier against ambient conditions and takes on the temperature gradient which would normally exist at the surface of the pool of fiber-forming material.

The use of the supernatant liquid can best be illustrated with reference to FIG. 1, which is a diagrammatic representation in cross-section of a portion of a fiber during formation and shows what is believed to take place in the pulling of a fiber according to this invention. In FIG. 1 there is provided a molten pool of fiber-forming material 10 covered by the supernatant liquid 12. To start the formation of a fiber it is only necessary to immerse a rod or like device into the molten pool by penetrating the supernatant liquid. When a quantity of material has attached itself to the rod it is pulled directly up bringing with it a certain quantity of the molten material which forms the gather 11. The gather in turn is surrounded by a layer of supernatant liquid 13, which gradually becomes thinner until the fiber 14 emerges therefrom. Thus in the primary attenuation distance noted in FIG. 1 the gather, and subsequently the fiber pulled therefrom, is cooled and there exists a temperature gradient from the molten pool of fiber-forming material to the point where the fiber is formed. As will be indicated later in the discussion of FIG. 2, it has been found preferable to control the temperature about the fiber 14 for a brief distance of its travel in order to complete attenuation and achieve uniform fiber diameter.

In FIG. 2 there is illustrated a typical embodiment of the process of this invention as it is applied to the making of thin continuous glass fibers. In this FIG. 2 the glass 10, having the supernatant liquid 12 (such as potassium chloride) on its surface, is contained in a platinum crucible 16 which in turn is held in a clay crucible 18. This clay crucible 18 serves to support the platinum crucible and also to seal the furnace walls from spilled glass or supernatant liquid.

The furnace 20 consists of an annular ring 21 having spirally wound heating coils 22 therein. The furnace, in order to keep the temperature above the supernatant liquid and of the atmosphere surrounding the fiber in the furnace at a controllable and predetermined level, may be covered with radiation shielding 24 which is equipped with a proper orifice 29 to permit the fiber formed to be withdrawn. The entire furnace is in turn placed in a suitable insulation 26. The temperature of the furnace may be measured by any suitable device such as a Chromel-Alumel thermocouple 23 located outside the furnace core and connected to a potentiometer 27 through leads 25. A drum 28 was provided for drawing and collecting the fiber and it was in turn driven by a variable speed motor 30.

In the operation of the apparatus of FIG. 2 it was found preferable to use the radiation shields 24 to provide a control of the quenching conditions in the furnace to obtain uniform diameter fibers. The actual quenching conditions which are to be established will depend on the design of the furnace, the glass composition to be used, the rate at which the fibers are to be pulled, and, of course, the diameter of the fibers themselves, so that each set of conditions to obtain the optimum quenching can be determined for any combination of glass, fiber diameter, and furnace design.

The material forming the supernatant liquid must be capable of eliminating or avoiding skin formation on the surface of the molten pool of fiber-forming material without altering the composition or materially changing the characteristics of the fiber-forming material. This means in turn that the supernatant liquid should be one which is essentially immiscible with the fiber-forming material under the conditions required in fiber formation. Moreover, it is preferable that the supernatant liquid be substantially unreactive with the molten fiber-forming material, that it have a density equal to or slightly less than the molten pool, that it have a melting point approximating that of the fiber-forming material, and that it have a viscosity somewhat lower at the operating temperature than the molten pool. The suitability of a material as a supernatant liquid for any given fiber-forming material may easily be determined by simple experiments to determine if it meets the above-stated requirements.

A number of examples of supernatant liquid materials may be cited. For instance, in forming glass fibers in accordance with this invention the chlorides of potassium, rubidium and cesium have been found particularly suited to this function. When glass compositions of relatively high densities (e.g., those containing large amounts of lead) are used, then metals such as aluminum and magnesium may be employed as the supernatant liquids. It may be pointed out that in pulling glass fibers salts such as NaCl and the fluorides are not suitable for they are miscible or react with the molten glass.

The thickness of the supernatant liquid may vary over a fairly wide range, generally being that which will provide the required thermal insulation and which will permit the required temperature gradient in the gather, as discussed above in connection with FIG. 1. For example, if the supernatant liquid were excessively thick, the temperature drop across the primary attenuation distance, i.e., to the point where the fiber emerges from the supernatant liquid, would be too small and there would be instabilities introduced into the fiber formation. In pulling glass fibers, for example, thicknesses of the supernatant liquid ranging from about $\frac{1}{32}$ to $\frac{3}{16}$ inch were found suitable.

Any of the well-known formulations which are now used in forming glass fibers are suitable for the process of this invention. These may generally be designated as the low-alkali, lime-aluminum borosilicates, the soda lime borosilicates, the soda lime glasses, the lime-free soda borosilicates, and the high lead silicates (see for example The Glass Industry, 41: 336 (June 1960)). Moreover, glass formulations heretofore considered unsuitable for forming glass fibers, including those having very high working temperatures and/or short working temperature ranges such as calcium aluminate glasses, may also be used in the process of this invention as long as a proper supernatant liquid is chosen to cover the molten pool of glass. Other inorganic vitreous materials suitable for forming fibers in accordance with this invention include, but are not limited to, arsenic trisulfide and antimony oxide glass compositions represented as $$R_2O\text{---}Al_2O_3\text{---}Sb_2O_3$$

(see for example Journal of the American Ceramic Society, 43: 387 (July 1960)).

In addition to the inorganic glasses, thermoplastic materials, or materials which exist in a thermoplastic state, which possess the required viscosity in a molten state may be used to form fibers in accordance with the practice of this invention. These thermoplastic materials may be synthetic polymers including the vinyl polymers and co-polymers, the polyesters, the polyamides, the acrylic resins, and polystyrenes. Naturally occurring thermoplastic materials (whether or not they are polymerized) may also be used as the fiber-forming materials. Examples of these naturally occurring fiber-forming materials include the resins such as copal, dammar and the like.

The thickness of the fibers drawn may be varied with respect to any given fiber-forming material by choice of supernatant liquid, its thickness as it exists on the molten pool, the quenching conditions employed (e.g., the temperature maintained above the supernatant liquid and surrounding the fiber as it emerges from the liquid), and the rate at which the fibers are drawn. Fiber thicknesses may vary over a wide range, for example from about one micron to one millimeter.

The invention may be further described with reference to the following examples which are meant to be illustrative and not limiting.

*Example I*

A typical low-alkali, lime-alumina borosilicate glass containing by weight 54.5% $SiO_2$, 14.5% $Al_2O_3$, 22% CaO, 8.5% $B_2O_3$ and 0.5% $Na_2O$ was used to form the fibers of this example. This glass has a softening point of 830° C. and a density of 2.596 gm./cc. The supernatant liquid used was molten KCl, an inorganic salt which has a density of 1.98 gm./cc., a melting point of 776° C. and a sublimation point of 1500° C.

The apparatus of FIG. 2 was used. The glass in the form of small chunks was introduced into the platinum crucible 16 and was then soaked at a temperature between 900° C. and 1000° C. until it had been reduced to a viscous melt having a viscosity of about 1000 poises.

The platinum crucible was temporarily removed and enough KCl was deposited upon the surface of the melt to make a supernatant layer of about ¼ inch thick of the thin watery liquid. The crucible was returned to its position inside the clay crucible 18 and was then ready for fibers to be drawn therefrom.

Fiber formation was started with the aid of a long Pyrex rod about 3 mm. in diameter which was pushed through the KCl and into the glass. The rod was permitted to remain until it was apparent that a quantity of glass was adhered thereto and then the rod was withdrawn. Once a good bond had been made the rod was raised vertically with a long fiber of glass following. This fiber in turn was taped to the rotating drum 28 which was rotated at one revolution per second. The furnace used had a 5-inch outside diameter and it was found that ceramic rings used as radiation shields were satisfactory when an aperture of 1 to 3 inches in diameter was left therein for withdrawing the fiber. Thus, the necessary quenching conditions were established within the interior of the furnace by the use of these radiation shields.

The resulting glass fiber was a uniform 10 microns in diameter. A very small amount of KCl was detected on the glass fiber surface, but this could easily be washed off.

*Example II*

Using the same apparatus as in Example I, a soda lime borosilicate glass having a composition of 59% by weight $SiO_2$, 4.5% $Al_2O_3$, 16% CaO, 5.5% MgO, 3.5% $B_2O_3$, 11.0% NaO and 0.5% $K_2O$ was used. This glass has a softening point of 715° C. and a density of 2.605 gm./cc. The supernatant liquid, used in the same manner as described above in Example I, was RbCl, which has a liquid density of 2.08 gm./cc., a melting point of 715° C. and a sublimation point of 1390° C.

Fibers were pulled from the molten glass in the same manner as described above in Example I. An equal degree of uniformity in fiber diameter was obtained.

In like manner a molten metal such as aluminum, which melts at 659° C. and has a density of 2.7 gm./cc., may be used as the supernatant liquid for a relatively dense glass composition such as a high-lead silicate glass containing 34% $SiO_2$, 3% $Al_2O_3$, 0.5% $Na_2O$, 3.5% $K_2O$ and 59% PbO. Densities of such glasses are typically around 4 gm./cc. or greater.

*Example III*

In this example a naturally occurring resin which was a white pine pitch was used as the fiber-forming material. Above about 70° C. this resin forms a highly viscous melt.

A quantity of this resin was melted in apparatus similar to that illustrated in FIG. 2 by adjusting the furnace temperature to about 90° C. At this temperature the resin had a viscosity of approximately 1000 poises.

Attempts were made to draw fibers from the molten resin pool without the use of a supernatant liquid. All such attempts to draw good fibers, even for a short period of time, were unsuccessful. Coarse fibers could be drawn for a short period of time but the diameters of these varied widely, while continuous drawing for more than a minute was rarely possible.

Then a layer of paraffin (melting point about 55° C.) was placed on the molten resin as the supernatant liquid. The thickness of this layer ranged between about ⅟₁₆ and ¼ inch. Radiation shields similar to those shown in FIG. 2 were used. Under these conditions very uniform fibers (from 20 to 50 microns in diameter) with less than ten percent variation in diameter were drawn for durations of an hour or more. It was noted that when the thicker supernatant layers were used (from ⅛ to ¼ inch) the attenuation of the fibers was accomplished almost entirely below the surface of the paraffin. Fiber-formation remained stable over a wide range of pulling speeds, i.e., from 1 to 25 feet/second.

*Example IV*

Fibers were also drawn from a synthetic resin as the fiber-forming material. A polystyrene having a softening point at 100° C. was placed in the apparatus illustrated in FIG. 2 and the furnace temperature brought up to the point where the polystyrene melted and had a viscosity of about 1000 poises. This was at approximately 110° C. A microcrystalline wax having a melting point of 90° C. was used as the supernatant liquid covering the pool and the layer of liquid was about ⁹⁄₁₆ inch. Continuous fibers having diameters of several microns were successfully drawn, the diameter being varied by varying the pulling rate.

It will be seen from the above description and examples that this invention provides a novel, simple and inexpensive method of continuously forming fibers from normally solid materials which are viscous when melted. The process is applicable to a wide variety of materials. Moreover, it is applicable to materials which have heretofore not been suitable for fiber-forming by present techniques for producing continuous fibers. Among these latter materials are glass compositions which, by virtue of their high working temperature or short temperature range could not be formed into fibers by the platinum bushing method.

I claim:

1. Process for continuously drawing thin fibers from a molten pool of a fiber-forming material, characterized by the steps of providing said molten pool with a supernatant liquid essentially immiscible and non-reactive with said fiber-forming material under the conditions of drawing, and drawing fibers from said pool through said supernatant liquid.

2. Process in accordance with claim 1 wherein said fiber-forming material is glass.

3. Process in accordance with claim 1 wherein said fiber-forming material is a synthetic thermoplastic material.

4. Process in accordance with claim 1 wherein said fiber-forming material is a naturally occurring thermoplastic material.

5. Process for making thin continuous fibers from a fiber-forming material, comprising the steps of forming a molten pool of said fiber-forming material, covering said molten pool with a supernatant liquid which is essentially immiscible and non-reactive with said molten pool and of a thickness sufficient to prevent any appreciable thermal gradient from being established within said pool normal to its surface, and drawing fibers from said pool through said supernatant liquid; said fiber-forming material being a normally solid material that when converted to a liquid state has a viscosity within the range of 5 to 3000 poises.

6. Process for making thin continuous glass fibers, comprising the steps of forming a pool of molten glass, covering said pool with a supernatant liquid at an elevated temperature and of sufficient thickness to thermally insulate the surface of said molten pool through said supernatant liquid, and pulling from said pool thin continuous fiber of glass, said supernatant liquid being further characterized as essentially immiscible in and substantially unreactive with said molten glass.

7. Process in accordance with claim 6 wherein said supernatant liquid is molten potassium chloride.

8. Process in accordance with claim 6 wherein said supernatant liquid is molten rubidium chloride.

9. Process in accordance with claim 6 wherein said supernatant liquid is a molten metal.

10. Process in accordance with claim 6 wherein the thickness of said supernatant liquid ranges between $1/32$ and $1/4$ inch.

11. Process for making thin continuous fibers from a fiber-forming material, comprising the steps of forming a molten pool of said fiber-forming material, covering said molten pool with a supernatant liquid which is essentially immiscible and non-reactive with said molten pool and of a thickness sufficient to prevent any appreciable thermal gradient from being established within said pool normal to its surface, drawing fibers from said pool through said supernatant liquid, and controllably quenching said fibers thereby to impart uniformity to the diameter of said fiber; said fiber-forming material being a normally solid material that when converted to a liquid state has a viscosity within the range of 5 to 3000 poises.

12. Process in accordance with claim 11 wherein said step of controllably quenching said fibers includes at least partially surrounding the surface of said supernatant liquid with radiation shielding.

References Cited in the file of this patent

UNITED STATES PATENTS

| | | |
|---|---|---|
| 1,904,706 | Bellis | Apr. 18, 1933 |
| 2,233,622 | Lytle | Mar. 4, 1941 |
| 2,323,383 | Dreyfus | July 6, 1943 |
| 2,363,695 | Ruppik | Nov. 28, 1944 |
| 2,634,553 | Russell | Apr. 14, 1953 |
| 2,708,617 | Magat et al. | May 17, 1955 |
| 2,916,347 | Russell | Dec. 8, 1959 |
| 2,962,755 | Plummer | Dec. 6, 1960 |

FOREIGN PATENTS

| | | |
|---|---|---|
| 165,052 | Great Britain | Dec. 28, 1921 |
| 452,810 | Great Britain | Aug. 31, 1936 |
| 712,918 | Germany | Oct. 28, 1941 |
| 1,195,956 | France | May 19, 1959 |